(12) United States Patent  
Cappellari et al.

(10) Patent No.: US 9,557,008 B2  
(45) Date of Patent: Jan. 31, 2017

(54) SAFETY SYSTEM IN A PORTABLE TOOL

(75) Inventors: Paolo Cappellari, Cesana Brianza LC (IT); Michele Norgia, Pavia (IT); Cesare Svelto, Milan (IT)

(73) Assignee: REDCAP TECHNOLOGY S.R.L., Como (IT)

( * ) Notice: Subject to any disclaimer, the term of this patent is extended or adjusted under 35 U.S.C. 154(b) by 833 days.

(21) Appl. No.: 13/818,724

(22) PCT Filed: Aug. 19, 2011

(86) PCT No.: PCT/EP2011/064290  
§ 371 (c)(1),  
(2), (4) Date: Feb. 25, 2013

(87) PCT Pub. No.: WO2012/025456  
PCT Pub. Date: Mar. 1, 2012

(65) Prior Publication Data  
US 2013/0152752 A1 Jun. 20, 2013

(30) Foreign Application Priority Data  
Aug. 24, 2010 (IT) .............................. MI2010A1566

(51) Int. Cl.  
*F16P 3/14* (2006.01)  
*B27G 19/00* (2006.01)

(52) U.S. Cl.  
CPC ............. *F16P 3/148* (2013.01); *B27G 19/003* (2013.01); *Y10T 83/081* (2015.04)

(58) Field of Classification Search  
CPC ........ B23Q 11/0082; F16P 3/145; F16P 3/148; F16P 3/14; F16P 3/147; Y10T 83/141; Y10T 83/162; Y10T 83/081; B27G 19/003  
(Continued)

(56) References Cited

U.S. PATENT DOCUMENTS 4,152,833 A * 5/1979 Phillips ................. B27B 17/083  
                                                          30/382  
5,942,975 A * 8/1999 Sorenson ........... B23Q 11/0082  
                                                          318/478  
(Continued)

FOREIGN PATENT DOCUMENTS

DE    296 22 144    3/1997  
EP    2 020 275    2/2009  
(Continued)

OTHER PUBLICATIONS

International Search Report dated Dec. 6, 2011, corresponding to PCT/EP2011/064290.

*Primary Examiner* — Ghassem Alie  
(74) *Attorney, Agent, or Firm* — Young & Thompson

(57) ABSTRACT

A safety system in a portable tool (1) includes a pair of electrodes connected to a measurement and assessment unit, the measurement and assessment unit being an integrated circuit touch sensor device provided with a ground connector and with a sense electrode, wherein the ground connector is configured as internal floating ground connected to one electrode, the measurement and assessment unit configured for acquiring a reference capacity value measured between the two electrodes varies by a preset difference threshold with respect to the reference value, the safety signal being sent to a tool deactivation actuator.

20 Claims, 2 Drawing Sheets

(58) Field of Classification Search
USPC .......... 83/58, 72, 76.1, DIG. 1, 62, 62.1, 63, 83/76.7, 788, 581; 30/381–387
See application file for complete search history.

(56) References Cited

U.S. PATENT DOCUMENTS

| | | | | |
|---|---|---|---|---|
| 5,984,020 A * | 11/1999 | Meyer | ................... | B23D 45/16 |
| | | | | 173/171 |
| 6,366,099 B1 * | 4/2002 | Reddi | ................ | G01R 27/2605 |
| | | | | 324/658 |
| 8,818,548 B2 * | 8/2014 | Aoki | ................... | A01D 34/828 |
| | | | | 340/680 |
| 2008/0302626 A1 * | 12/2008 | Rossi | ................... | B27G 19/003 |
| | | | | 192/129 A |
| 2010/0064532 A1 * | 3/2010 | Wittke | ................. | B27G 19/003 |
| | | | | 30/382 |
| 2010/0180740 A1 | 7/2010 | Krapf et al. | | |

FOREIGN PATENT DOCUMENTS

| | | |
|---|---|---|
| FR | 2 831 476 | 5/2003 |
| WO | 97/12174 | 4/1997 |
| WO | 2007/060698 | 5/2007 |

* cited by examiner

SAFETY SYSTEM IN A PORTABLE TOOL

FIELD OF THE INVENTION

The present invention refers to a safety system for chainsaws and similar portable cutting tools.

BACKGROUND ART

As it is known, there exists portable work equipment, such as chainsaws and the like, which comprises moving cutting parts and which exposes users to a high risk of injury. As a matter of fact, while it is relatively easy to arrange shields and/or accident-prevention protection elements on fixed equipment and machine tools, so as to avoid any accidental contact with moving parts, this is not feasible on portable equipment.

Safety arrangements for chainsaws and similar tools have already been suggested, specifically dedicated to solving the safety problems connected with the use of such devices. In particular, two different approaches have been put forward, one based on a mechanical passive system and another one based on a remote-detection system. In both cases it is intended to promptly detect a condition of excessive closeness between an operator's limbs and the moving parts (such as the cutting chain of a chainsaw) to stop in time the operation of the tool and to hence limit the damage resulting from a possible direct contact.

WO2007060698, in the name of the same Applicant, shows an example of safety system for such equipment, wherein the approach of the remote detection of the relative position between cutting tool and operator is used.

In this publication it is suggested to use a radio-frequency transmission system for detecting the relative position of the operator with respect to the blade of a chainsaw. The receiving-transmitting system in radio frequency operates similarly to a condenser system, obtaining a signal proportional to the distance between two electrodes, one inserted in an item of safety clothing of the operator and the other one in the chainsaw blade portion.

In other prior art disclosures, such as U.S. Pat. No. 5,942,975, the use of capacitive systems for detecting a capacitive difference between two electrodes for determining the relative distance thereof is disclosed.

However, these well-known systems generally require the use of suitable garments wherein a circuit and active electronic equipment are inserted which makes up one of the two capacitive plates of the system. Moreover, they do not have an optimal operation, because the emission of the safety signal is affected by environmental conditions (for example, air humidity, operator's mass and clothing, and others).

WO9712174 discloses another example of safety system applied—among other things—to a cutting tool. In this case, the distance between a receiver and a transmitter (possibly integral with an operator's body) is detected through the reading of the absolute value of a transmitted signal. This implies problems of sensitivity and adaptation to the specific conditions, so much so that a grounding arrangement is suggested in order not to trigger an undesired deactivation of the tool. Such system has proved cumbersome and poorly applicable in the field of portable cutting tools which are suited to operate in highly changeable conditions.

US2010180740 discloses a safety system provided with a calibration unit. The calibration unit is provided for changing the warning threshold of significant quantities detectable by a sensor unit, which sensor is hence intended for activating an emergency signal still upon the exceeding of an absolute (calibrated) threshold value of the detected quantities. This implies simply adapting the reference threshold to the boundary conditions, with loss of system sensitivity. Moreover, the calibration unit has a complex operation, resorting to a detection device separate from the sensor unit for detecting values of some reference quantities to be entered in a feedback loop and compared against default values prestored in a suitable memory. The use of absolute reference thresholds implies that the operator must cooperate, lying at a short distance from the tool for the calibration operation to be completed.

SUMMARY OF THE INVENTION

The object of the present invention is hence to solve the drawbacks which still affect prior-art systems, in particular to supply a safety system which, despite being like a capacitive-type, is able to solve the above drawbacks in a original way being efficient, economic and unaffected by environmental changes.

Such purpose is achieved through a system as described in its essential features in the attached main claim.

Other inventive aspects of the system are described in the dependent claims.

In particular, according to a first aspect of the invention, a safety system is provided in a cutting portable tool provided with a gripping and handling body and a moving cutting part, comprising a pair of electrodes, a distal one and a proximal one, arranged on the cutting part downstream (with respect to the operator) of the handling body and at least partly on the handling body, respectively, the two electrodes being connected to a measurement and assessment unit installed on the handling body, wherein:

said measurement and assessment unit consists of an integrated circuit of a "touch sensor" device provided with a ground connector and with a sense electrode, wherein the ground connector is configured as internal floating ground connected to said proximal electrode or to said distal electrode and the sense electrode coincides with said distal electrode or with said proximal electrode, respectively, and in that said measurement and assessment unit is configured for acquiring a reference capacity value at least upon turning on the portable cutting tool and for issuing a safety signal when the capacity value measured between said two electrodes varies by a preset threshold with respect to said reference capacity value, the safety signal being sent to an actuator for the deactivation of the tool.

According to a preferred aspect, the safety signal is issued when said measured capacity value increases by a preset absolute value in the order of 0.5 pF with respect to said reference capacity value and/or when said measured capacity value increases with respect to said reference value according to a derivative which exceeds a preset value.

According to another aspect, the proximal electrode comprises at least one electrically conductive element arranged on a grip of said handling body so that it remains in contact with the operator's hand during operation; the proximal electrode preferably comprises at least one conductive element inserted in an applicator which may be worn in contact with the operator's body during operation, for example in the shape of a glove which may be worn on the operator's hand during operation.

According to another aspect, the proximal electrode comprises at least one conductive element integral with the handling body of said tool and coupled in a capacitive manner with the operator's body during operation.

It is advantageous that the capacitive or resistive impedance between said conductive element of the proximal electrode and the operator's body be below the capacitive impedance detectable by said measurement and assessment unit between said proximal electrode and said distal electrode at the minimum threshold distance at which the safety signal output is wished to occur.

According to another aspect, in the safety system of the invention said measurement and assessment unit is a touch sensor device of the charge-transfer type, wherein an electric signal of a voltage below 2.5 V is burst sent toward said sense electrode. According to an embodiment, the sense electrode of the touch-sensor device coincides with the proximal electrode intended to be placed in electric-conduction contact with the operator's body.

BRIEF DESCRIPTION OF THE DRAWINGS

Further features and advantages of the device according to the invention will in any case be more evident from the following detailed description of a preferred embodiment of the same, given by way of example and illustrated in the attached drawings, wherein.

DETAILED DESCRIPTION OF PREFERRED EMBODIMENTS OF THE INVENTION

Let us consider a portable cutting tool 1, such as a chainsaw, which is gripped by an operator 2 in a position typically as far as possible from the moving blade.

During correct use, the tool is tilted with the cutting blade opposite to the operator and led to oscillate, for performing the cutting, according to arches of a circle which keep the blade substantially at the same distance from the operator's body.

In certain accidental cases, due to the operator's imprudence or as a reaction to sudden jams of the moving blade, the tool may come excessively close to the operator, with the concrete risk arising that the moving cutting parts impacts against the operator's body.

A safety system hence provides to detect the exceeding of a minimum distance threshold between the cutting portion of the tool and the operator, and to consequently interrupt the movement of the cutting parts, for example by discontinuing the supply to the tool engine.

The technique employed to detect the proximity of the cutting parts to the person gripping the tool consists in measuring a variation of electric capacity.

According to the invention, the measurement capacity system is entirely mounted within the tool, with two opposite contacts which are part of two electrodes of an equivalent theoretical capacitor: one on the cutting part of the tool and one on the tool grip, in a position suited to come into electrical conduction contact with the operator's body.

The contact mounted on the cutting part (in the following referenced as "blade"), which makes up one of the system electrodes, is suitably electrically insulated from the other contact. Typically, in chainsaw-like tools, provisions already require that the support blade of the cutting chain be electrically insulated from the tool grip: this is achieved through suitable mounting configurations with the arrangement of insulating materials. Alternatively, a layer of insulating material can be arranged between this contact and the underlying tool blade.

System capacity is detected by a measuring device between the two opposite contacts, as indicated in the following.

While one of the equivalent system electrodes coincides with the same contact installed on the blade (or with the contact+blade assembly if the two are not mutually insulated), the other electrode consists of the contact on the grip together with the operator's body 2.

Figure 1:
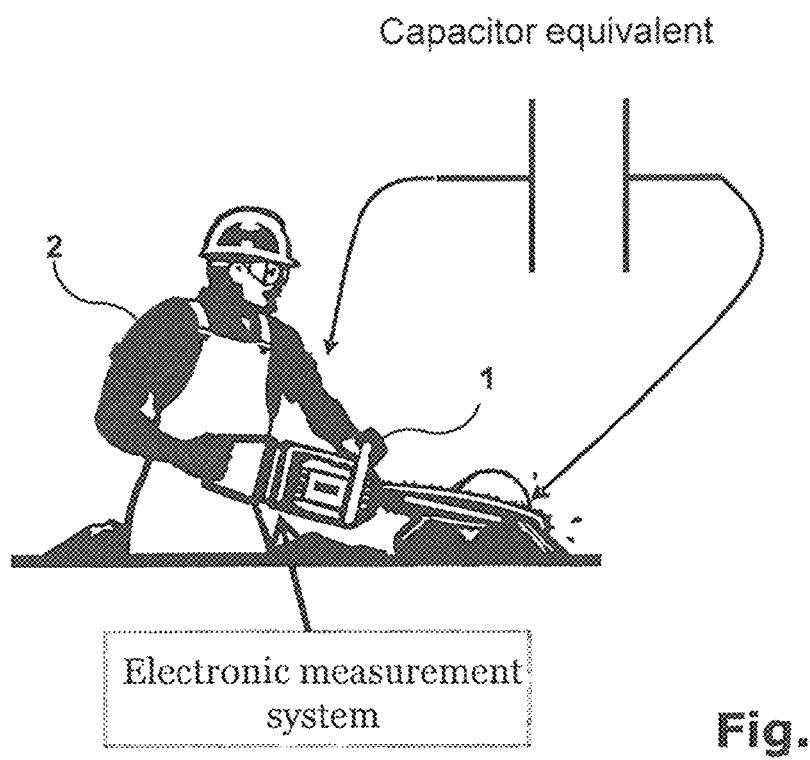
FIG. 1 is a diagram showing the concept of equivalent capacity measured by the system according to the invention.

In order to correctly define the circuit and achieve the correct operation of the system, obtaining the desired active protection, the operator's body must hence be put in electrical connection with the contact found on the grip. Thereby the capacity C measured by the measurement device (FIG. 1) coincides with the capacity between the first electrode (operator's body and connector thereof) and the second electrode (blade-mounted connector). In other words, a distal system electrode, arranged on the blade, exhibits fixed features which are defined by the specific configuration of the tool; the other proximal electrode, comprising the operator's body itself—as everybody knows conductive of electricity—hence has varying features depending mainly on the operator's build and on the environmental humidity conditions.

The electric connection between operator and contact on the grip can be accomplished in various ways. A direct connection may be obtained, through a metal plate arranged on the grip or on the trigger, which touches directly the operator's hand. A specific glove may be used, with a metal contact. A contact through electric wire may be provided, which wire must be connected in some way to the operator. In order to optimise the electric coupling it is possible to employ a metal fabric within the operator's clothing, which must be connected directly with the contact (through a cable or a suitable glove). The electric connection between the operator and the contact of the electronic measurement system may also be of a capacitive type: for example, it is possible to arrange a layer of insulating material (plastic, fabric, rubber) between the operator's hand and the contact.

In any case, for the correct operation of the system it is important that the capacitive or resistive impedance between operator 2 and the contact on the grip be sufficiently lower than the capacitive impedance existing between the operator (proximal electrode) and the contact on the blade (distal electrode) at the minimum threshold distance at which the turning off action of the tool blade is wished to occur; otherwise the system loses sensitivity and hence reliability.

In a suitable position of the tool, for example within the sump or housing of a chainsaw, an electronic device for the measurement of the capacity between the two proximal and distal electrodes is arranged. The measurement device reads the capacity between the two electrodes (continuously, if of the analogical type, or with a certain sampling frequency, if of the digital type) and sends a turning-off signal, typically directed at the general switch of the tool (for example, a switch which cuts off the power supply to the electric motor of the cutting blade or to the ignition coil in an internal combustion engine), in case of sudden increase of the detected capacity C (i.e. if the rate or derivative of the capacity increase over time exceeds a preset threshold) or in case such detected measure exceeds by a preset threshold difference value the capacity measure detected in the initial starting step.

As a matter of fact, it was detected that these two modes of action are effective since, in case of the blade coming closer to the body (i.e. the two electrodes coming closer to each other), the capacity C read by the system configured according to the invention increases with distance with an approximately hyperbolic equation. An example of the trend of capacity C as a function of the distance of the blade from the body is reported in FIG. 2.

According to the invention, the electronic circuit measuring capacity is accomplished by installing and configuring in a fully original way an measuring capacity integrated circuit implemented in a touch-sensor device, as the "charge-transfer touch sensor" systems manufactured by Quantum Research Group (now Atmel Corporation).

Figure 3:
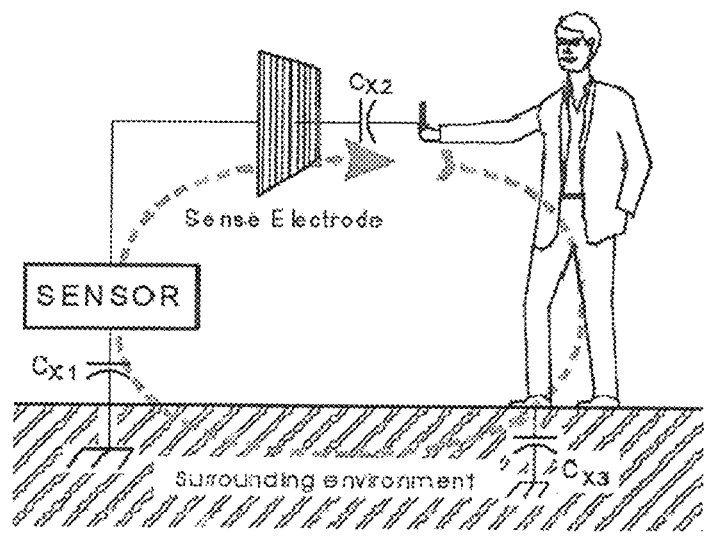
FIG. 3 is an exemplifying diagram of traditional operation of touch sensors.

These sensors are traditionally employed in domotics plants: they are wall-mounted and measure the change of capacity towards a large mass due to the coming closer of a human body. FIG. 3 shows a mounting and operation diagram of a typical touch sensor, taken from the manual of the QProx™ QT113 processor manufactured by Quantum. An integrated circuit typically has two electrodes, an active one (sense electrode) and a grounded one. The circuit provides a signal to the sense electrode, in the form of bursts of electric charge (voltage of about 1-2.5 V with frequencies in the order of microseconds). The sensor reveals the proximity of a user through the charge variation seen on the same electrode due to the change of capacity with respect to the ground caused by the user coming close to the sense electrode. This hence implies that these devices be grounded through the grounded electrode.

In the application according to the invention, such devices are used in an original way: i.e. the ground contact or electrode of the device is purposefully not grounded (and it is envisaged to limit at most any capacitive coupling with the ground), thereby determining a floating internal ground which is used as one of the two detection electrodes of the system.

In so doing, two possible configurations are provided, one with the sense electrode on the tool blade, and the other one with the sense electrode in electrical conduction contact with the operator.

Figure 4A:
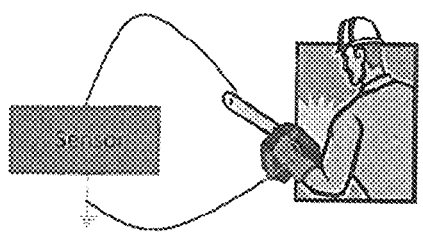
FIGS. 4A and 4B are diagrams of two configurations according to the invention.

In the first case (FIG. 4A) the internal floating ground electrode of the sensor is connected to the grip of the cutting tool and hence strongly coupled with the operator. The impulse signal is instead connected to the sense electrode on the tool blade. With this configuration the system detects the proximity of the blade to any conductive object of a sufficient size, therefore the issuance of the safety signal is triggered both due to the proximity to the operator, and in the fortuitous case of proximity to another person (the trigger distance—i.e. of triggering of the safety signal—is smaller than with the operator touching the grip, but also protects from accidents to third parties); the trigger of the safety system occurs also in case of proximity to a large conductive object (for example a metal table), offering a protection to the chainsaw which avoids damages.

Figure 4B:
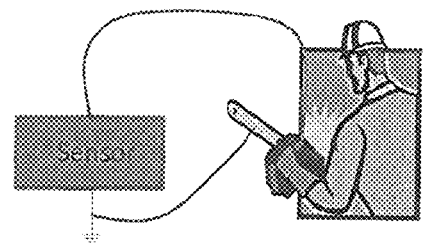

In the second case (FIG. 4B) the internal floating ground of the device is connected to the tool blade. The sense electrode is arranged on the chainsaw grip and the impulse signal is hence strongly coupled with the operator. With this configuration the system is extremely selective: the trigger occurs only when the cutting part is in proximity of the operator gripping the tool; false alarms are greatly limited and system connections are simplified (no particular electrical insulations are to be provided): the entire chainsaw is connected to the floating ground of the sensor and the impulses are connected to the operator only.

Therefore, the integrated touch-sensor device, suitably reconfigured according to the teaching provided here, is capable of measuring the capacity between the operator's body and the chainsaw blade and of generating a digital signal when the capacity increases by a preset threshold difference value.

Figure 2:
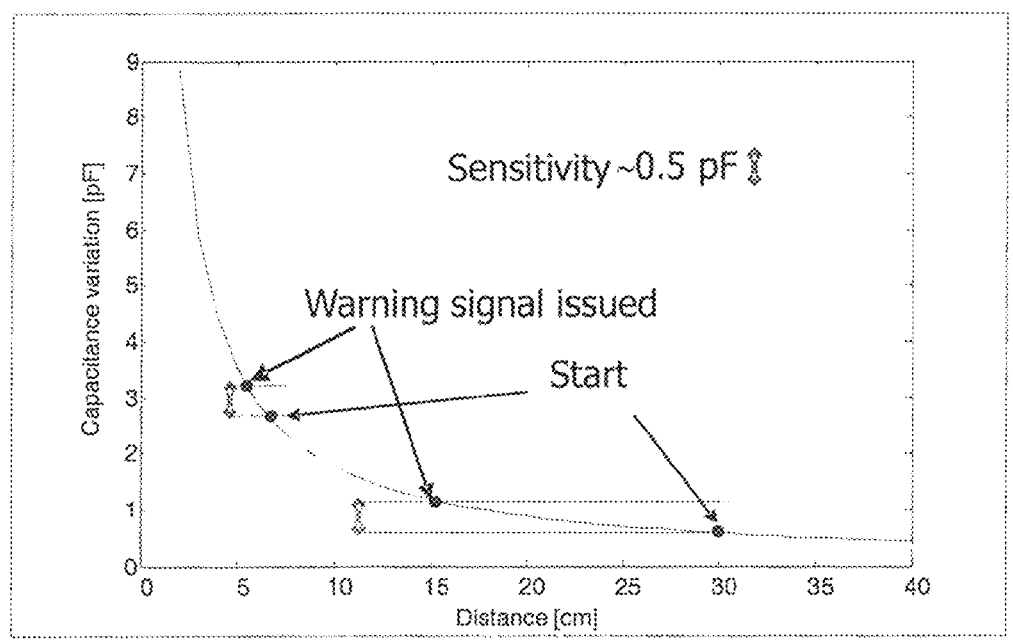
FIG. 2 is an exemplifying diagram of the variation of measured capacity during the use of the system of the invention.

Moreover, according to a preferred embodiment of the invention, such circuit is configured so as to measure the initial capacity upon the turning on thereof and to temporarily store it as reference value; a safety or trigger signal, in form of digital output, is issued by the integrated circuit to an actuator for the deactivation of the tool, when the read capacity increases by a preset amount (called sensitivity) with respect to the reference value, for example when the variation exceeds 0.5 pF (FIG. 2). The measured initial capacity is in the order of a few picofarad, while the sensitivity is measured in fractions of picofarad.

In substance, it is sufficient to obtain an initial capacity measurement—with the same sense electrode of the touch-sensor device (without resorting to other additional sensors)—which is temporarily stored as reference value, to hence obtain an automatic and repeatable adjustment of the system with respect to the measurement environment and in particular to the specific operator gripping the tool. As a matter of fact, the measured initial capacity depends on the tool size, on the operator's size and also on the surrounding environment (for example on the possible presence of metal walls next to the operator or on the existing humidity). The safety signal causing turningoff of the portable tool is generated when the capacity increases by the preset value (sensitivity) with respect to the reference value, or when the capacity increase over time (derivative) exceeds a second threshold value.

FIG. 2 shows how the hyperbolic feature of capacity in the system of the invention makes the system intrinsically safe, even when it is turned on with the blade already near the operator: with reasonable values it is possible to detect that a turning on of the system 30 cm away the operator still enables to clearly ascertain the moving closer to a safety threshold of 15 cm, while turning the device on 7 cm away the operator brings the detectable threshold down to 5 cm. In any case, with the blade moving closer to the operator's body, the capacity value tends to quickly diverge, with a high value in the derivative of the curve, leading to immediate triggering of the security system.

The generated safety signal can be used in various ways to control the deactivation of the moving parts of the tool, through the turning off of the power supply and the possible intervention of braking systems. In particular, in the application to chainsaws with internal combustion engine, where it is unpleasant for the engine to be stopped at each action of the safety system, it can be provided that the safety signal be used exclusively for driving a braking device of the cutting chain, for example in the way taught in the application filed at the same time by the same Applicant.

Other examples of measurements of capacities are: measurement in frequency of an astable electronic oscillator, connected to the capacity to be measured; digital capacity meter with sigma-delta converter; capacity measurement through the measurement of the transmission of a sinusoidal or impulse signal; measurement with bridge techniques; measurement with resonance techniques; measurement with current-voltage techniques.

The integrated measurement device has a minimal size and is mounted on an electronic board containing
- some passive elements (resistances and capacity) necessary for correct operation,
- a transistor stage, for supplying the necessary current to an actuator delegated to the safety function, and
- a voltage stabiliser for the power supply.

In an embodiment, the actuator is a turning-off relay which is intended to short-circuit an electric supply coil (in the case, for example, of chainsaws) or to cut-off power supply to the electric motor of the cutting chain (in the case, for example, of electric chainsaws).

The power supply for the circuit on the board is taken either directly from the chainsaw—through circuits which take the required power from the coil—or, given the negligible consumption (in the order of 600 μA), from a small battery mounted on board. In the case of an electric saw, the power supply is taken directly from the power main.

The electronic circuit may be small, in the order of 1 cm², and is hence easily inserted directly into the chainsaw body, in any position, provided it can be put in contact—through a simple cable—with the cutting part (blade) and with the grip (or with another connector to be applied to the operator's body). In addition to such circuit, the actuator (relay) and the supply components can be arranged in other positions inside the chainsaw, so as to minimise the bulk thereof.

Summarising, the system according to the invention can consist of only 4 elements:
1) an electronic board with integrated measuring device and electrodes therefor;
2) power supply system to the board;
3) actuator for the turning-off of the chainsaw (typically a relay);
4) internal contacts towards the cutting part (blade) and towards the grip/operator.

Electric Chainsaw Operation

The board with the integrated circuit takes the power supply from the power main, in series to the turning-on button of the chainsaw: the circuit turns on when the operator pushes the chainsaw button. At that time the initial capacity is calculated and the reference value is determined. The circuit enables a (normally open) relay which carries the supply power to the chainsaw (which hence turns on). When the initial capacity exceeds a maximum preset threshold, the circuit does not enable the relay, keeping the chainsaw off: thereby, in case of circuit malfunctioning, the chainsaw does not even start.

Chainsaw Operation with Internal Combustion Engine

The board with the integrated circuit takes the power supply from the coil: therefore, first the chainsaw turns on, then the security circuit turns on. At that time the initial capacity is detected. In parallel to the ignition spark of the engine a normally open relay is arranged, which is closed by the security circuit when the detected capacity exceeds a preset threshold: at that time, the safety signal short-circuits the spark and the chainsaw engine turns off. Alternatively to, or in combination with, the turning-off relay, the turning-off actuator can consist of an electromechanical actuator which acts on the braking system of the cutting chain.

As can be clearly understood from the above-reported description, the safety system according to the invention allows to perfectly achieve the objects set forth in the preliminary remarks. In particular, the simple circuit of the invention is capable of determining with a certain precision the distance reduction between the tool blade and the operator. The safety signal, used for controlling an actuator delegated to the deactivation of the tool, is generated in various ways which prevent any error and especially without being affected by the specific environmental conditions.

However, it is understood that the invention is not limited to the particular configurations illustrated above, which represent only non-limiting examples of the scope of the invention, but that a number of variants are possible, all within the reach of a person skilled in the field, without departing from the scope of the invention.

For example, it can be provided that the initial reference value be redetermined not only after a turning-off of the portable tool, but whenever the tool has remained at the minimum revolution number for a preset minimum time: this ensures the correct readjustment of the safety system even when the tool is temporarily not used, without turning it off, and then use thereof is resumed in very different conditions (by another operator or in a very different position).

The invention claimed is:

1. A portable tool with a safety system, comprising:
   a handling body, the handling body including a tool grip allowing gripping of the tool by a user;
   a moving cutting part,
   the safety system comprising a pair of electrodes comprised of i) a distal electrode arranged on the cutting part downstream of the handling body and ii) a proximal electrode arranged at least partly on the handling body, the distal and proximal electrodes being connected to a measurement and assessment unit installed on the handling body, wherein, said measurement and assessment unit is comprised of an integrated circuit touch sensor device provided with a ground connector and with a sense electrode, wherein the ground connector is configured as internal floating ground connected to said proximal electrode or to said distal electrode and the sense electrode coincides with said distal electrode or with said proximal electrode, respectively,
   wherein said measurement and assessment unit is configured for acquiring a reference capacity value at least upon turning on the portable tool and for issuing a safety signal when the capacity value measured between said two electrodes varies by a preset difference threshold with respect to said reference value, the safety signal being sent to a tool deactivation actuator.

2. The portable tool as claimed in claim 1, wherein said safety signal will be issued when said measured capacity value increases by a preset difference value in the order of 0.5 pF with respect to said reference value.

3. The portable tool as claimed in claim 2, wherein said safety signal will be issued when said measured capacity increases with respect to said reference value according to a derivative which exceeds a preset value.

4. The portable tool as claimed in claim 2, wherein said proximal electrode comprises at least one electrically conductive element located on a grip of said handling body so that it remains in contact with the operator's hand during operation.

5. The portable tool as claimed in claim 2, wherein said proximal electrode comprises at least one conductive element inserted in an applicator which can be worn in contact with the operator's body during operation.

6. The portable tool as claimed in claim 2, wherein said proximal electrode comprises at least one conductive element integral with the handling body of said portable tool and coupled in a capacitive manner with the operator's body during operation.

7. The portable tool as claimed in claim 1, wherein said safety signal will be issued when said measured capacity increases with respect to said reference value according to a derivative which exceeds a preset value.

8. The portable tool as claimed in claim 1, wherein said proximal electrode comprises at least one electrically conductive element located on a grip of said handling body so that it remains in contact with the operator's hand during operation.

9. The portable tool as claimed in claim 8, wherein the capacitive or resistive impedance between said electrically conductive element and the operator's body is below the capacitive impedance detectable by said measurement and assessment unit between said proximal electrode and said distal electrode at the minimum threshold distance at which it is wished for the issuing of said safety signal to occur.

10. The portable tool as claimed in claim 1, wherein said proximal electrode comprises at least one conductive element inserted in an applicator which can be worn in contact with the operator's body during operation.

11. The portable tool as claimed in claim 10, wherein the capacitive or resistive impedance between said electrically conductive element and the operator's body is below the capacitive impedance detectable by said measurement and assessment unit between said proximal electrode and said distal electrode at the minimum threshold distance at which it is wished for the issuing of said safety signal to occur.

12. The portable tool as claimed in claim 10, wherein said wearable applicator is shaped as a glove which can be worn on the operator's hand during operation.

13. The portable tool as claimed in claim 12, wherein the capacitive or resistive impedance between said electrically conductive element and the operator's body is below the capacitive impedance detectable by said measurement and assessment unit between said proximal electrode and said distal electrode at the minimum threshold distance at which it is wished for the issuing of said safety signal to occur.

14. The portable tool as claimed in claim 1, wherein said proximal electrode comprises at least one conductive element integral with the handling body of said portable tool and coupled in a capacitive manner with the operator's body during operation.

15. The portable tool as claimed in claim 14, wherein the capacitive or resistive impedance between said electrically conductive element and the operator's body is below the capacitive impedance detectable by said measurement and assessment unit between said proximal electrode and said distal electrode at the minimum threshold distance at which it is wished for the issuing of said safety signal to occur.

16. The portable tool as claimed in claim 1, wherein said measurement and assessment unit is a touch sensor device of the charge-transfer type wherein an electric signal of a voltage below 2.5 V is burst sent toward said sense electrode.

17. The portable tool as claimed in claim 16, wherein said sense electrode coincides with the proximal electrode intended to be put in electrical conduction contact with the operator's body.

18. The portable tool as claimed in claim 1, wherein the portable tool is a chainsaw.

19. The portable tool as claimed in claim 1, wherein the ground connector is configured as the internal floating ground connected to said proximal electrode and the sense electrode coincides with said distal electrode.

20. The portable tool as claimed in claim 1, wherein the ground connector is configured as the internal floating ground connected to said distal electrode and the sense electrode coincides with said proximal electrode.

* * * * *